(12) United States Patent
Tanaka

(10) Patent No.: US 8,081,264 B2
(45) Date of Patent: Dec. 20, 2011

(54) LIQUID CRYSTAL DEVICE AND ELECTRONIC APPARATUS

(75) Inventor: Yoshiki Tanaka, Mizuho (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 12/404,680

(22) Filed: Mar. 16, 2009

(65) Prior Publication Data
US 2009/0256982 A1    Oct. 15, 2009

(30) Foreign Application Priority Data

Apr. 11, 2008   (JP) ................. 2008-103428

(51) Int. Cl.
*G02F 1/1337*   (2006.01)
*G02F 1/133*    (2006.01)
(52) U.S. Cl. .......................... 349/40; 349/123
(58) Field of Classification Search .......... None
See application file for complete search history.

(56) References Cited

U.S. PATENT DOCUMENTS
| | | | |
|---|---|---|---|
| 2007/0222930 A1 | 9/2007 | Fukami et al. | |
| 2008/0079856 A1* | 4/2008 | Fukui et al. | 349/5 |
| 2008/0278644 A1* | 11/2008 | Fukami et al. | 349/37 |

FOREIGN PATENT DOCUMENTS
| | | |
|---|---|---|
| JP | 2002-311456 | 10/2002 |
| JP | A-2002-311456 | 10/2002 |
| JP | 2007-256796 | 10/2007 |
| JP | A-2007-256796 | 10/2007 |

OTHER PUBLICATIONS

Japanese Office Action for corresponding JP 2008-103428 issued on May 25, 2010.

* cited by examiner

*Primary Examiner* — Sarah Hahm
(74) *Attorney, Agent, or Firm* — K&L Gates LLP

(57) ABSTRACT

A liquid crystal device is provided that includes a pair of substrates having a liquid crystal layer disposed therebetween, the liquid crystal layer containing therein liquid crystal molecules of which the alignment state during no-voltage application corresponds to a splay alignment state; and a conductive alignment regulating member which is at least partially disposed in a frame region defining the perimeter of a pixel region on one substrate of the pair of substrates.

11 Claims, 6 Drawing Sheets

LIQUID CRYSTAL DEVICE AND ELECTRONIC APPARATUS

BACKGROUND

1. Technical Field

The present invention relates to a technical field of an OCB (Optically Compensated Bend) mode liquid crystal device which is suitable for display of various information images, for example and an electronic apparatus having the liquid crystal device such as a portable information terminal.

2. Related Art

As such a type of liquid crystal devices, an OCB-mode liquid crystal device is proposed in which at least one of a pixel electrode and a TFT (Thin Film Transistor) element is disposed in a non-display portion located at the outer circumference of a display pixel portion. In the liquid crystal device, there is proposed a technique of applying a predetermined electric potential to a pixel electrode disposed in the non-display portion so that an alignment state of the liquid crystal molecules is suppressed from transition reversely from a bend alignment state to a splay alignment state (see Japanese Unexamined Patent Application Publication No. 2002-311456).

However, according to the technique disclosed in Japanese Unexamined Patent Application Publication No. 2002-311456, there is a problem that unless the pixel electrode and the TFT element are disposed in the non-display portion, it is difficult to sufficiently suppress occurrence of reverse transition.

SUMMARY

An advantage of some aspects of the invention is that it provides a liquid crystal device capable of suppressing the occurrence of reverse transition of the liquid crystal molecules from the bend alignment state to the splay alignment state in a simple and effective manner and an electronic apparatus having the liquid crystal device.

According to an aspect of the invention, there is provided a liquid crystal device including a pair of substrates having a liquid crystal layer disposed therebetween, the liquid crystal layer containing therein liquid crystal molecules of which the alignment state during no-voltage application corresponds to a splay alignment state; and a conductive alignment regulating member which is at least partially disposed in a frame region defining the perimeter of a pixel region on one substrate of the pair of substrates.

According to the liquid crystal device of the above-described aspect of the invention, a pair of substrates has disposed therebetween a liquid crystal layer containing therein liquid crystal molecules of which the alignment state during no-voltage application corresponds to a splay alignment state. The alignment state of the liquid crystal molecules is in the bend alignment state when a predetermined voltage is applied between the pair of substrates during driving of the liquid crystal device. That is, the liquid crystal device is an OCB-mode liquid crystal device. On a side of at least one surface of the pair of substrates opposing the liquid crystal layer, an organic alignment film having a predetermined rubbing direction or an inorganic alignment film formed of inorganic material such as SiO or $SiO_2$ are formed. On a side of the pair of the substrate opposing the liquid crystal layer, the organic alignment film or the inorganic alignment film may be formed.

The conductive alignment regulating member is at least partially disposed in a frame region defining the perimeter of a pixel region on one substrate of the pair of substrates and is at an electric potential for allowing the liquid crystal layer of the frame region to be in the bend alignment state. The alignment regulating member is configured, for example, as a wiring line extending along at least a portion of the outer border of a pixel region or a conductive member formed in an island shape. Here, the "pixel region" according to the invention does not mean individual pixel regions but means the entire region on which a plurality of pixels is arranged on a plane and typically corresponds to "image display region" or "display region."

In the liquid crystal device of the above-described aspect of the invention, the liquid crystal device may further includes a pixel electrode disposed on the one substrate of a pair of substrates; and a counter electrode disposed in the one substrate of the pair of substrates so as to oppose the pixel electrode, and the alignment regulating member may be applied with an electric potential so that an electric voltage is applied between the alignment regulating member and the counter electrode so that the liquid crystal layer in the frame region is in a bend alignment state. The electric potential of the conductive alignment regulating member (i.e., the electric potential for allowing the liquid crystal layer in the frame region to be in the bend alignment state) is such an electric potential that an electric voltage equal to or greater than an electric voltage (hereinafter, referred to as "bend transition voltage") necessary for transition from the splay alignment state to the bend alignment state is applied between the counter electrodes arranged on the one substrate of the pair of substrates and the alignment regulating member, and the electric potential means an electric potential which is fixed for at least predetermined period. For example, the electric potential may be a fixed potential such as ground potential that is completely fixed at a constant potential with respect to time axis or may be an electric potential that varies every one horizontal or vertical period in response to inversion of a driving voltage applied to the liquid crystal layer every one horizontal or vertical period. That is, the electric potential only needs to be an electric potential having an effective value in an alternating or square wave, capable of allowing the liquid crystal layer to be substantially in the bend alignment state (that is, so that the liquid crystal layer cannot be viewed on the display).

According to the studies of the present inventor, it was found that since the liquid crystal molecules disposed in the frame region is not applied with an electric voltage equal to or greater than the bend transition voltage (in other words, an electrode for controlling the alignment state of the liquid crystal molecules is not provided in the frame region), the liquid crystal molecules are in the splay alignment state even during driving of the liquid crystal device. Therefore, in the vicinity of the boundaries of the pixel region and the frame region, there is a possibility that the alignment state of the liquid crystal molecules disposed in the pixel region transitions reversely from the bend alignment state to the splay alignment state due to the influence of the liquid crystal molecules disposed in the frame region. In order to suppress the occurrence of the reverse transition, there is proposed a technique of disposing at least one of a pixel electrode and a TFT element at the outer circumference of the pixel region. However, it has proven that unless the pixel electrode and the TFT element are disposed, it is difficult to sufficiently suppress the occurrence of the reverse transition, and that there is a possibility of complicating the structure of the liquid crystal device or increasing the manufacturing cost.

In the invention, the conductive alignment regulating member is at least partially disposed in the frame region. Moreover, an electric voltage equal to or greater than the bend transition voltage is applied between the alignment regulating member and the counter electrode, for example. Therefore, even when such a reverse transition occurs, the transition may occur near the outer circumference of the alignment regulating member within the frame region and may have no influence on the liquid crystal molecules disposed in the pixel region. In addition, it is only necessary to form wiring lines or a conductive member, for example, as the alignment regulating member, and it is very advantageous from a practical perspective.

As a result, according to the liquid crystal device of the above-described aspect of the invention, it is possible to suppress the occurrence of the reverse transition of the alignment state of the liquid crystal molecules from the bend alignment state to the splay alignment state in a simple and effective manner. Therefore, it is possible to display high-quality images.

In an embodiment of the liquid crystal device of the invention, the alignment regulating member may include a body portion that is disposed so as to extend along two opposing sides of an outer border of the pixel region.

According to this embodiment, the body portion is disposed so as to extend along two opposing sides (typically, sides extending in a direction intersecting the extending direction of the scan lines arranged in the pixel region on the one substrate) of an outer border of the pixel region.

According to the studies of the prevent inventor, it was proven that the reverse transition is more likely to occur in the extending direction of the scan lines than in the extending direction of the data lines arranged in the pixel region. Therefore, by arranging the body portion so as to extend along the side extending in the direction intersecting the extending direction of the scan lines, it is possible to effectively suppress the occurrence of the reverse transition, and it is very advantageous from a practical perspective.

In the embodiment where the body portion is provided, the alignment regulating member may further include an extension portion disposed so as to extend along sides adjacent to at least one of the two sides of the outer border.

By constructing in such a manner, for example, when the pixel region is rectangular, the perimeter of the pixel region can be surrounded in a frame shape by the body portion and the extension portion, and thus, it is possible to suppress the occurrence of the reverse transition.

In the embodiment where the extension portion is provided, the extension portion may be formed in a second layer different from a first layer in which the body portion is disposed.

By constructing in such a manner, when the alignment regulating member is disposed in the same layer as that of the data lines or the scan lines, for example, it is possible to surround the perimeter of the pixel region in a frame shape so as not to make contact with the data lines or the scan lines, and thus, it is very advantageous from a practical perspective.

In another embodiment of the liquid crystal device of the above-described aspect of the present invention, the liquid crystal device further includes voltage supply means for supplying the electric potential to the alignment regulating member.

According to this embodiment, the voltage supply means supplies an electric potential to the alignment regulating member so that the liquid crystal layer in the frame region is in the bend alignment state. Therefore, it is possible to suppress the occurrence of the reverse transition in a relatively easy manner.

In the embodiment where the voltage supply means is provided, the voltage supply means may supply the electric potential for common use with a portion of various driving signals for driving the liquid crystal layer in the pixel region.

By constructing in such a manner, it is not necessary to additionally provide a special voltage supply unit for supplying an electric voltage to the alignment regulating member, and it is only necessary to electrically connect the alignment regulating member with wiring lines to which driving signals are supplied. Therefore, it is very advantageous from a practical perspective.

In a further embodiment of the liquid crystal device according to the above-described aspect of the invention, the alignment regulating member constitutes at least a portion of an electrostatic protection circuit for protecting the liquid crystal device against static electricity.

According to this embodiment, since it is not necessary to additionally form wiring lines or the like in order to provide the alignment regulating member, it is possible to suppress any increase in the manufacturing cost, for example, and thus, it is very advantageous from a practical perspective.

In a still further embodiment of the liquid crystal device according to the above-described aspect of the invention, the alignment regulating member is formed in an island shape as viewed in plan view on the one substrate.

According to this embodiment, it is possible to dispose the alignment regulating member so as not to make contact with wiring lines or the like which are arranged on the same layer as the alignment regulating member, and thus, it is very advantageous from a practical perspective.

In a still another embodiment of the liquid crystal device according to the above-described aspect of the invention, the one substrate comprises a plurality of pixel electrodes arranged in a matrix in the pixel region, and the alignment regulating member is disposed in a layer different from that of the plurality of pixel electrodes with an interlayer insulating film disposed therebetween.

According to this embodiment, when the alignment regulating member is formed of a material having a relatively high conductivity such as aluminum, by forming the alignment regulating member in a layer different from that of the pixel electrode formed of a transparent conductive oxide such as ITO (Indium Tin Oxide) with an interlayer insulating film disposed therebetween, it is possible to suppress any increase in the process steps of manufacture of the liquid crystal device, and thus, it is very advantageous from a practical perspective.

According to another aspect of the invention, there is provided an electronic apparatus including the liquid crystal device (including various embodiments thereof) according to the above-described aspect of the invention.

According to the electronic apparatus of the above-described aspect of the invention, since the electronic apparatus includes the liquid crystal device according to the above-described aspect of the invention, it is possible to suppress the occurrence of the reverse transition in a simple and effective manner. As a result, it is possible to realize various electronic apparatuses capable of displaying high-quality images, such as a projection display apparatus, a television, a portable phone, an electronic personal organizer, a portable audio player, a word processor, a digital camera, a viewfinder type or monitor-direct-view type video tape recorder, a workstation, a TV telephone, a POS terminal, or a touch panel.

The functions and other advantages of the aspects of invention will become apparent upon a reading of the following description of exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
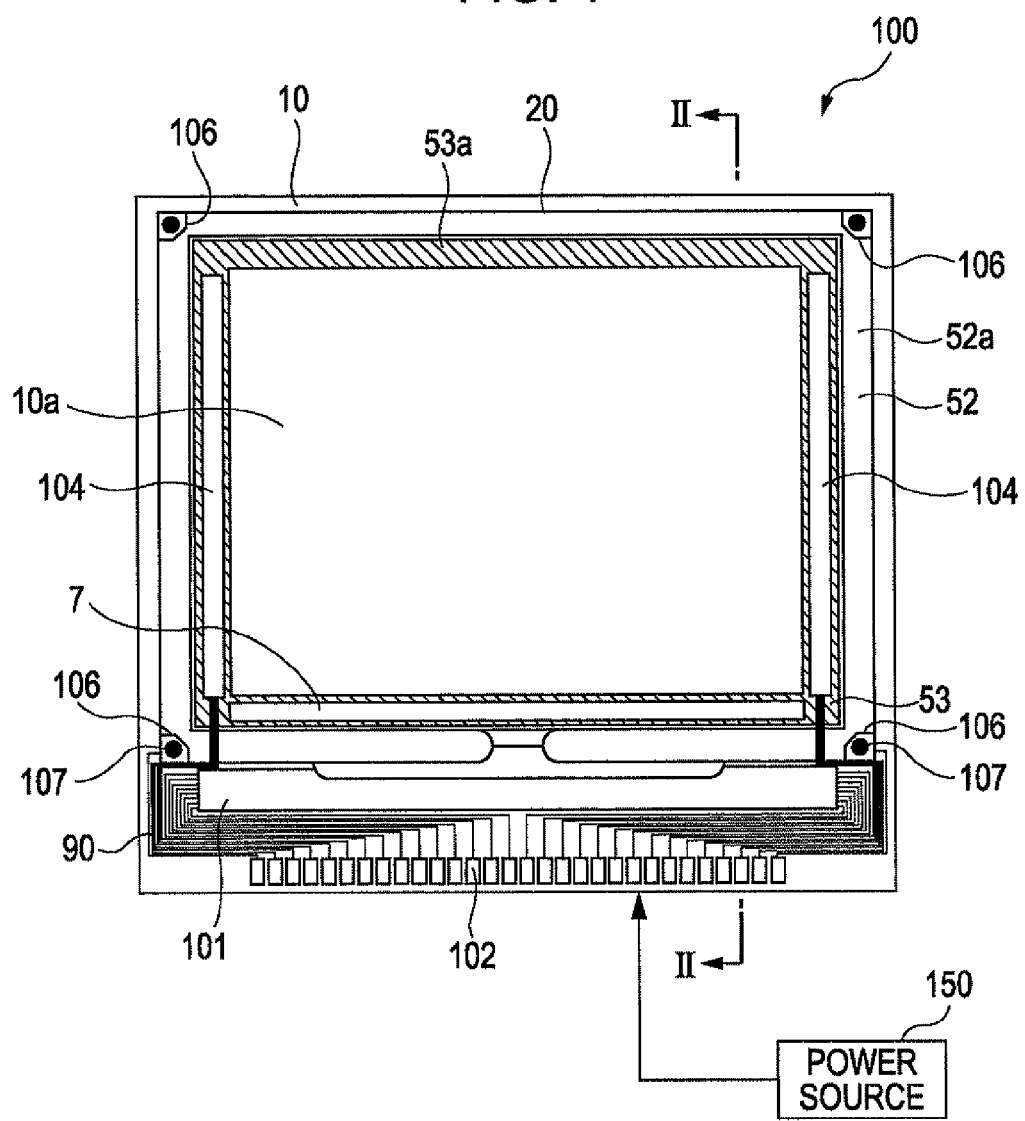
FIG. 1 is a plan view of a TFT array substrate according to an embodiment of the invention and constituent elements formed thereon as viewed from an counter substrate side.

Hereinafter, embodiments of a liquid crystal device and an electronic apparatus according to the invention will be described with reference to the accompanying drawings. In the drawings below, individual layers or individual members are appropriately depicted with different reduced scales in order to make them large enough to be recognized on the drawings. Moreover, in later-described embodiments, a TFT active matrix type liquid crystal device having a built-in driving circuit will be described as an example of a liquid crystal device.

Liquid Crystal Device

A liquid crystal device according to the embodiments of the invention will be described with reference to FIGS. 1 to 7.

First, a structure of the liquid crystal device according to the invention will be described with reference to FIGS. 1 and 2. Here, FIG. 1 is a plan view of a TFT array substrate and elements formed thereon as viewed from a counter substrate side, and FIG. 2 is a cross-sectional view taken along the line II-II in FIG. 1.

Figure 2:
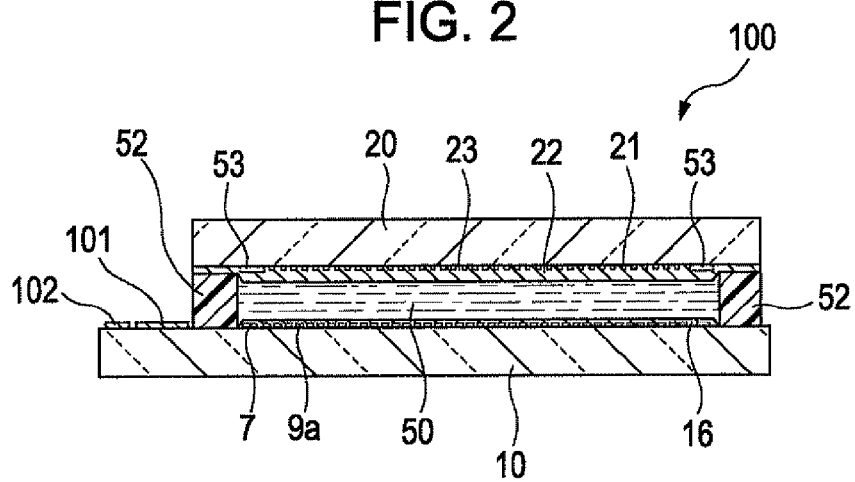
FIG. 2 is a cross-sectional view taken along the line II-II in FIG. 1.

In a liquid crystal device 100 illustrated in FIGS. 1 and 2, a TFT array substrate 10 and an counter substrate 20 as an example of "a pair of substrates" according to the invention are disposed to oppose each other. The TFT array substrate 10 is configured as a substrate such as a quartz substrate, a glass substrate or a silicon substrate, and the counter substrate 20 is configured as a substrate such as a quartz substrate or a glass substrate. A liquid crystal layer 50 is filled between the TFT array substrate 10 and the counter substrate 20.

The liquid crystal layer 50 is configured to contain therein liquid crystal molecules of which the alignment state during no-voltage applications corresponds to a splay alignment and the alignment state during driving of the liquid crystal device 100 corresponds to a bend alignment. That is, the liquid crystal device 100 is an OCB-mode liquid crystal device.

The TFT array substrate 10 and the counter substrate 20 are bonded to each other by a sealing member 52 disposed in a sealing region 52a disposed around an image display region 10a as an example of "a pixel region" according to the invention. The sealing member 52 is formed, for example, of a ultraviolet-curable resin, heat-curable resin, or resin curable by both ultraviolet radiation and heat for bonding both substrates and is applied onto the TFT array substrate 10 during manufacturing processes to be cured by ultraviolet radiation, heat, or the like.

In the image display region 10a and a peripheral region located at the periphery of the image display region 10a, gap materials such as glass fibers or glass beads are disposed so as to maintain a predetermined distance (i.e., gap) between the TFT array substrate 10 and the counter substrate 20. It should be noted that the gap material may be mixed into the sealing member 52 as an alternative to, or in addition to, the gap material being disposed in the image display region 10a and the like.

In FIG. 1, a frame-shaped light shielding film 53 that defines the image display region 1a is provided on the side of the counter substrate 20 at an inside of the sealing region 52a so as to extend in parallel with the sealing region 52a in which the sealing member 52 is disposed. However, it should be noted that a part of or the entirety of the frame-shaped light shielding film 53 may be formed on the side of the TFT array substrate 10 as an internal light shielding film.

A data line driving circuit 101 and external circuit connection terminals 102 are provided in a portion of the peripheral region disposed outside the sealing region 52a in which the sealing member 52 is disposed so as to extend along one side of the TFT array substrate 10. A sampling circuit 7 is provided at an inner side than the sealing region 52a disposed along the one side so as to be covered by the frame-shaped light shielding film 53. A scan line driving circuit 104 is provided in a frame region 53a at an inside of the sealing region 52a disposed along two sides adjacent to the one side so as to be covered by the frame-shaped light shielding film 53.

Moreover, a non-illustrated alignment regulating member formed of metal, such as aluminum, or conductive oxides, such as ITO, is at least partially disposed in the frame region 53a. During driving of the liquid crystal device 100, the alignment regulating member is supplied with an electric potential for realizing a bend alignment state from a power source 150 as an example of "voltage supply unit" according to the invention via the later-described external circuit connection terminals 102. The power source 150 is shared with a power source for driving the liquid crystal device 100.

On the TFT array substrate 10, vertical conduction terminals 106 are arranged at regions opposing four corners portions of the counter substrate 20 so as to connect both substrates with vertical conduction members 107. With these terminals, it is possible to achieve electrical conduction between the TFT array substrate 10 and the counter substrate 20. Furthermore, drawing lines 90 are formed on the TFT array substrate 10 so as to electrically connect the external circuit connection terminals 102 with the data line driving circuit 101, the scan line driving circuit 104, the vertical conduction terminals 106, and the like.

In FIG. 2, a stack structure having formed therein pixel switching TFTs as driving elements and wiring lines such as scan lines or data lines is formed on the TFT array substrate 10. A plurality of scan lines and a plurality of data lines are arranged so as to intersect each other, whereby pixel parts corresponding to pixels are formed in a matrix so as to correspond to the intersections. Although the detailed construction of the stack structure is not illustrated in FIG. 2, pixel electrodes 9a formed of transparent material such ITO are formed in an island shape in a predetermined pattern for each pixel.

The pixel electrodes 9a are formed on the image display region 10a on the TFT array substrate 10 so as to oppose later-described counter electrodes 21. An alignment film 16 is formed on a surface of the TFT array substrate 10 facing the liquid crystal layer 50, namely on the pixel electrodes 9a so as to cover the pixel electrodes 9a.

Figure 3:
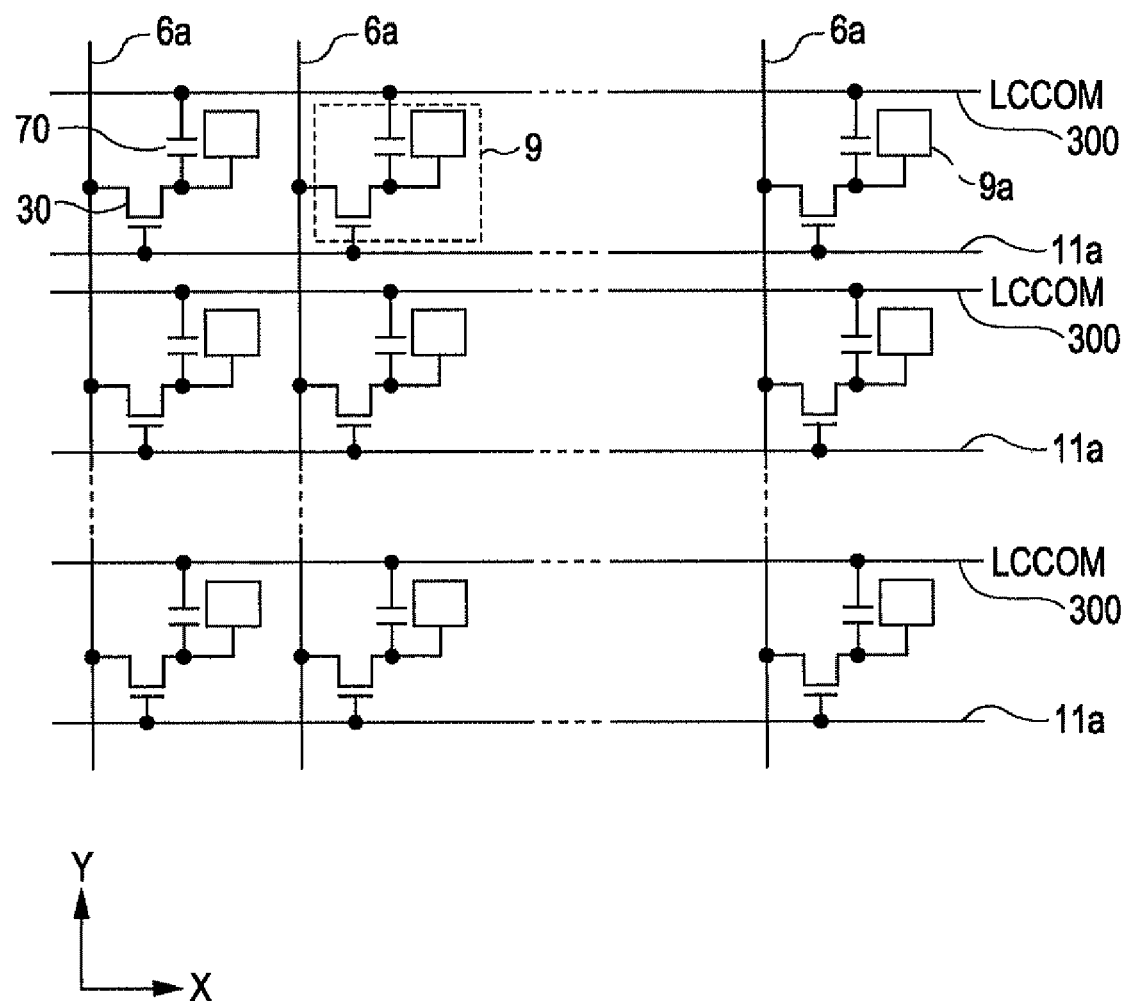
FIG. 3 is an equivalent circuit diagram of various elements and wiring lines formed in a pixel part of a liquid crystal device according to the embodiment of the invention.

Next, a description of the pixel part will be provided with reference to FIG. 3. FIG. 3 is an equivalent circuit diagram of various elements and wiring lines formed in the pixel part.

As illustrated in FIG. 3, each of the plurality of pixel parts 9 includes the pixel electrode 9a and a TFT 30 for switching the pixel electrode 9a. A data line 6a for supplying a data signal is electrically connected to a source of the TFT 30. Moreover, a gate electrode is electrically connected to a gate of the TFT 30 so that a scan signal is applied in a pulsating manner to a scan line 11a and the gate electrode at a predetermined timing.

The pixel electrode 9a is electrically connected to a drain of the TFT 30 so that the data signal supplied from the data line 6a is written at a predetermined timing when the TFT 30 as the switching element is turned off for a predetermined period.

The data signal having a predetermined level having written to liquid crystals via the pixel electrode 9a is held for a predetermined period between counter electrodes 21 fixed at the common potential level LCCOM and formed on the counter substrate 20 (see FIG. 2). The liquid crystals modulate light by changing the alignment or the order of the molecules thereof according to the applied voltage level to perform gradation display.

Here, in order to prevent the held data signal from leaking, a storage capacitance 70 is added in parallel with a liquid crystal capacitance formed between the pixel electrode 9a and the counter electrode 21. One electrode of the storage capacitance 70 is provided in parallel with the scan line 11a and is electrically connected to a capacitance line 300 fixed at the common potential level LCCOM, thus functioning as a fixed potential-side capacitance electrode. The other electrode of the storage capacitance 70 is electrically connected to the pixel electrode 9a, thus functioning as a pixel potential-side capacitance electrode.

Returning again to FIGS. 1 and 2, a light shielding film 23 is formed on a surface of the counter substrate 20 opposite to the TFT array substrate 10. The light shielding film 23 is formed on the opposite surface of the counter substrate 20 in a grid shape when viewed in a plan view. In the counter substrate 20, a non-opening region is defined by the light shielding film 23 and a region partitioned by the light shielding film 23 is an opening region through which light emitted from a direct-view type backlight passes. Moreover, the light shielding film 23 may be formed in a stripe shape so that the non-opening region is defined by the light shielding film 23 and various components such as data lines provided at the side of the TFT array substrate 10. Furthermore, in order to display color images on the image display region 10a, color filters may be formed in a region including a portion of the opening region and a portion of the non-opening region.

Moreover, counter electrodes 21 formed of transparent material such as ITO are formed on the light shielding film 23 so as to oppose the plurality of pixel electrodes 9a. On the opposite surface of the counter substrate 20, an alignment film 22 is formed on the counter electrodes 21.

Further, in addition to the data line driving circuit 101, the scan line driving circuit 104, and the sampling circuit 7, a precharge circuit for supplying a precharge signal having a predetermined voltage level to the plurality of data lines prior to the image signal and a test circuit for testing quality and defects of the liquid crystal device during manufacture or shipping thereof may formed on the TFT array substrate 10 illustrated in FIGS. 1 and 2.

Figure 4:
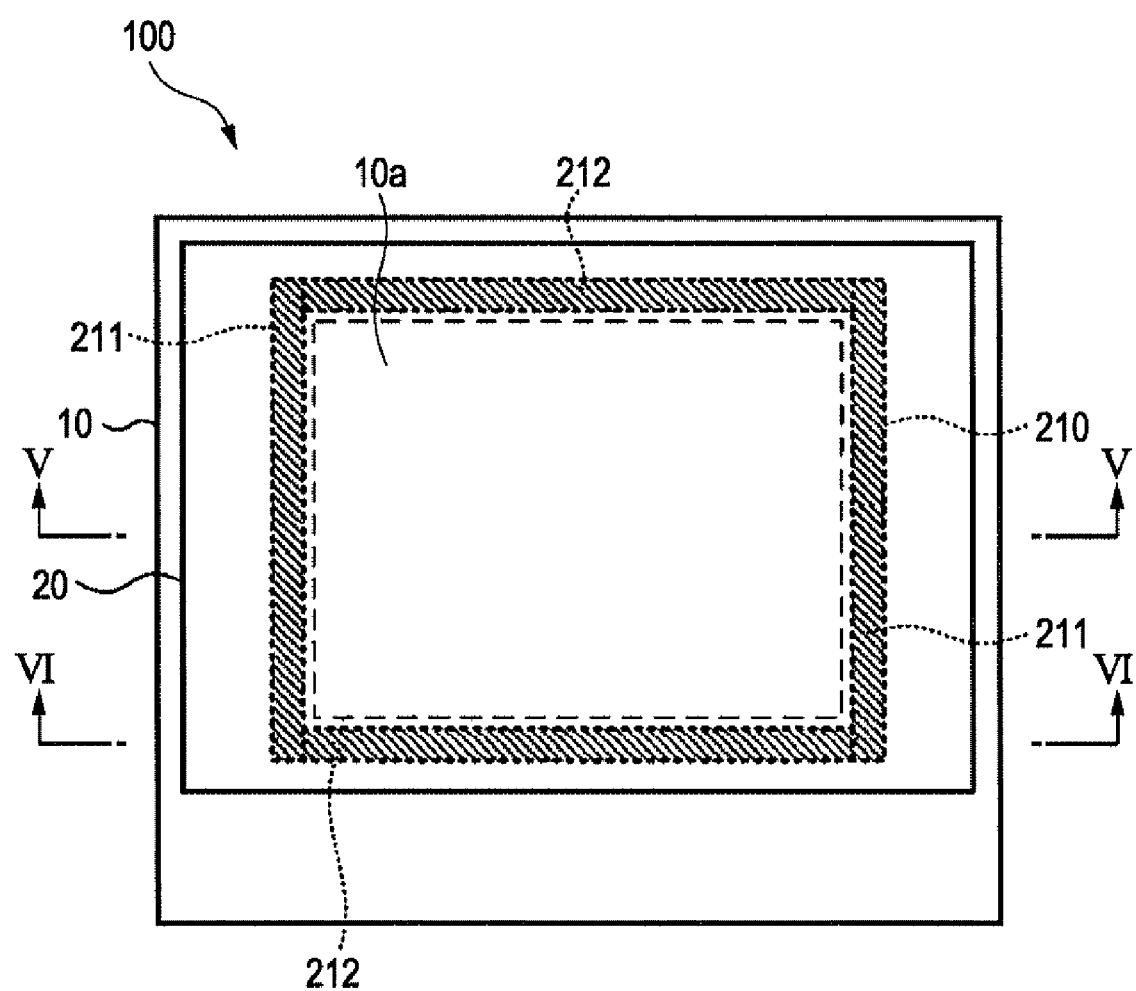
FIG. 4 is a plan view of the liquid crystal device according to the embodiment of the invention.
Figure 5:
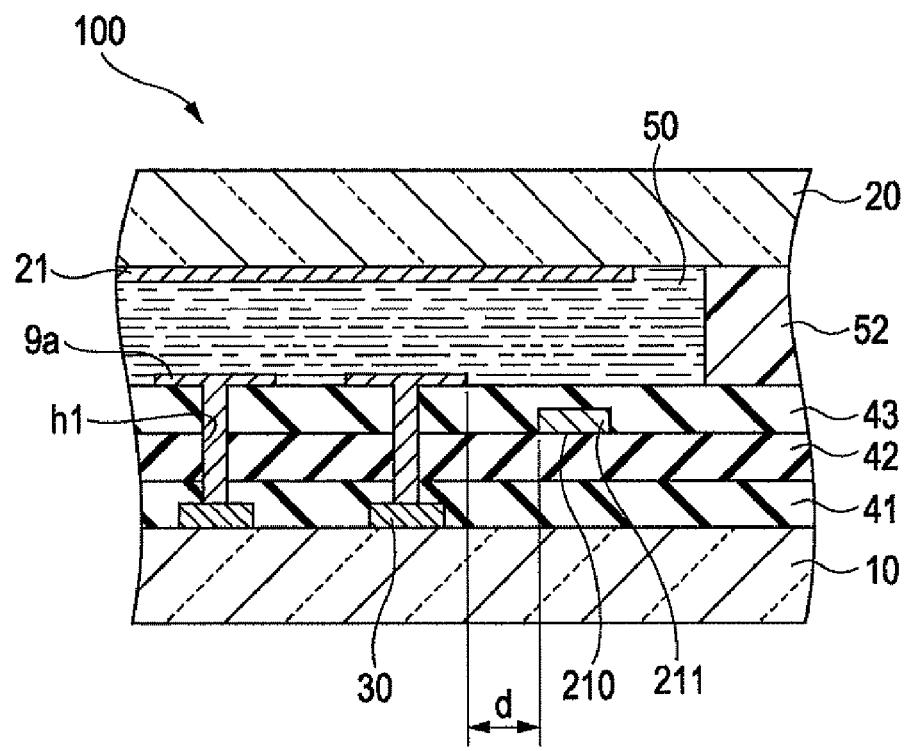
FIG. 5 is an enlarged partial cross-sectional view taken along the line V-V in FIG. 4.
Figure 6:
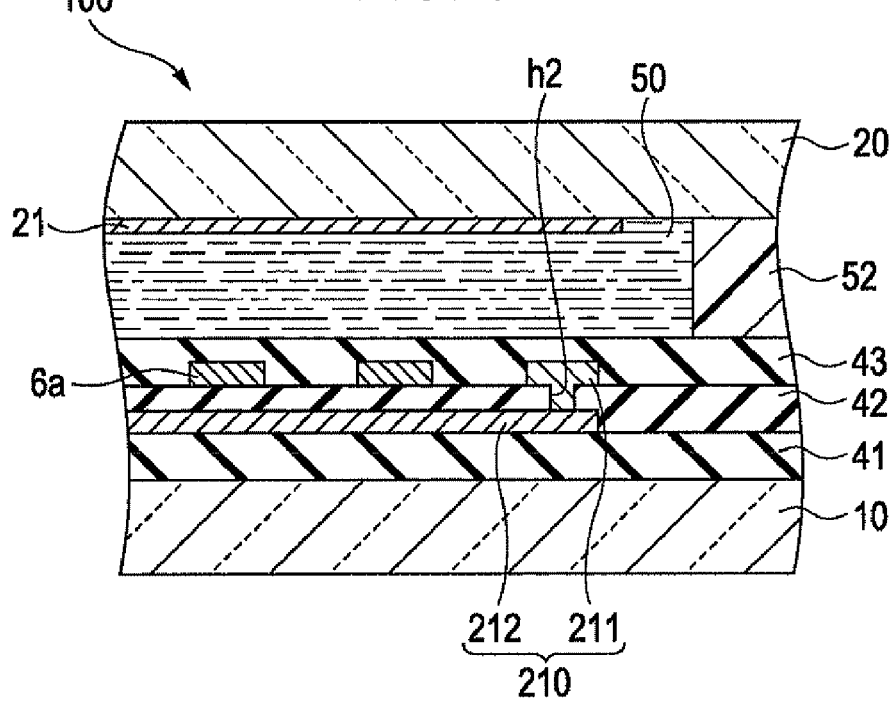
FIG. 6 is an enlarged partial cross-sectional view taken along the line VI-VI in FIG. 4.

Next, the alignment regulating member will be described in detail with reference to FIGS. 4 to 6. FIG. 4 is a plan view of the liquid crystal device according to the present embodiment, FIG. 5 is an enlarged partial cross-sectional view taken along the line V-V in FIG. 4, and FIG. 6 is an enlarged partial cross-sectional view taken along the line VI-VI in FIG. 4. In the following drawings, the detailed members of the liquid crystal device 100 depicted in FIGS. 1 and 2 will be appropriately omitted and only related members will be illustrated.

In FIG. 4, an alignment regulating member 210 is disposed in the frame region 53a (see FIG. 1) defining the perimeter of the image display region 10a. The alignment regulating member 210 includes a body portion 211 disposed so as to extend along two opposing sides of an outer border of the image display region 10a and an extension portion 212 disposed so as to extend along sides adjacent to at least one of the two sides. During driving of the liquid crystal device 100, an electric potential is applied to the alignment regulating member 210 so that an electric voltage equal to or greater than a bend transition voltage is applied between the alignment regulating member 210 and the counter electrodes 21 (see FIG. 2). For this, at least a portion of the counter electrodes 21 is disposed on the opposing side of the alignment regulating member 210.

In FIG. 5, a plurality of pixel switching TFTs 30 is formed on the TFT array substrate 10. The pixel electrodes 9a are electrically connected to gate electrodes (not illustrated) of the respective TFTs 30 via contact holes h1 formed in interlayer insulating films 41 to 43.

In FIG. 6, the body portion 211 and the extension portion 212 are electrically connected with each other via a contact hole h2 formed in the interlayer insulating film 42. In this manner, by arranging the body portion 211 and the extension portion 212 on different layers via the interlayer insulating film 42, it is possible to arrange the alignment regulating member 210 so as not to make contact with the plurality of data lines 6a as illustrated in FIG. 6. In other words, it is possible to arrange the alignment regulating member 210 without completely or greatly changing an existing wiring layout.

Figure 7:
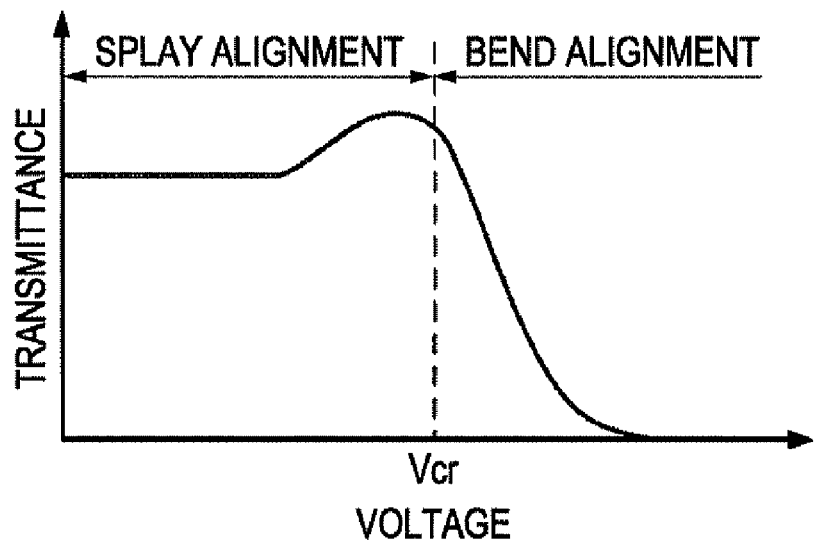
FIG. 7 is a characteristic diagram illustrating an example relationship between an electric potential applied to a liquid crystal layer of the liquid crystal device according to the embodiment of the invention and transmittance.

Next, an electric voltage applied to the liquid crystal layer 50 will be described with reference to FIG. 7. FIG. 7 is a characteristics diagram illustrating an example relationship between the electric voltage applied to the liquid crystal layer and transmittance. In the figure, voltage Vcr represents a bend transition voltage.

As illustrated in FIG. 7, at voltages equal to or greater than the voltage Vcr where the alignment state of the liquid crystal molecules contained in the liquid crystal layer 50 transitions to the bend alignment state, the transmittance decreases as the voltage increases. Therefore, by applying an electric voltage near the voltage Vcr or equal to or greater than the voltage Vcr to the liquid crystal molecules disposed in the image display region 10a (i.e., between the pixel electrode 9a and the counter electrode 21), it is possible to improve the transmittance (and thus improve the contrast ratio).

If the alignment regulating member 210 is not provided, there is a possibility that due to fluctuation of an electric field, the alignment state of the liquid crystal molecules, particularly in the outer border of the image display region 10a, transitions reversely from the bend alignment state to the splay alignment state.

However, in the present embodiment, the alignment regulating member 210 is at such an electric potential that an electric voltage equal to or greater than the bend transition voltage is applied between the alignment regulating member 210 and the counter electrodes 21. Therefore, even when such a reverse transition occurs, the transition may occur near the outer circumference of the alignment regulating member 210 and may have no influence on the liquid crystal molecules disposed in the image display region 10a. The present inventor has proven through studies that in order to effectively utilize the advantage of the alignment regulating member 210, a distance d (see FIG. 5) between the outermost pixel electrode 9a of the image display region 10a and the alignment regulating member 210 is preferably equal to or smaller than the width of the pixel electrode 9a, specifically equal to or smaller than 50 μm.

It should be noted that the alignment regulating member 210 may be formed as at least a portion of an electrostatic protection circuit for protecting the liquid crystal device 100 against static electricity. Furthermore, the alignment regulating member 210 and the pixel electrodes 9a may be disposed on the same layer (i.e., on the interlayer insulating film 43).

Modification

Figure 8:
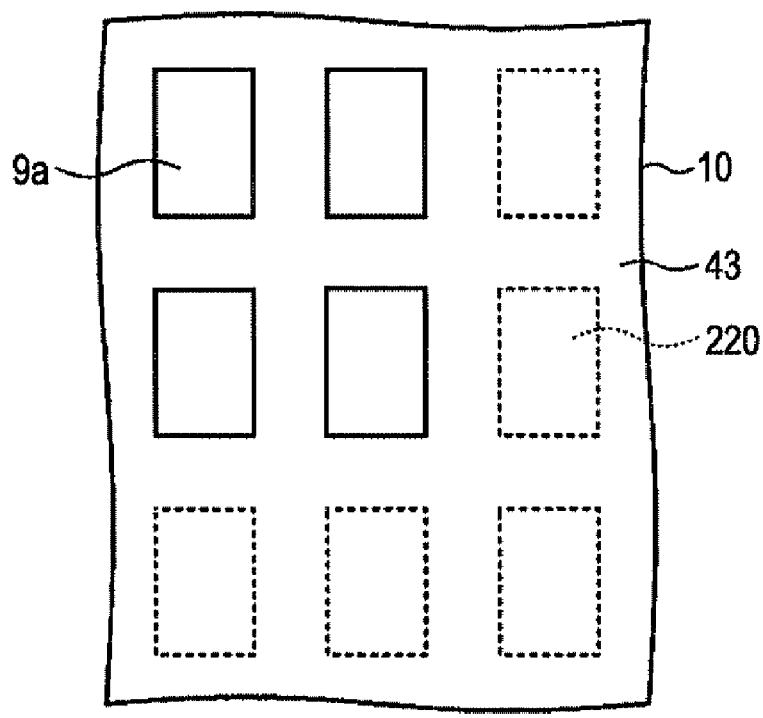
FIG. 8 is a plan view of a modification of an alignment regulating member according to an embodiment of the invention.

Next, a modification of the alignment regulating member in the liquid crystal device according to the present embodiment will be described with reference to FIG. 8. FIG. 8 is a plan view of the modification of the alignment regulating member according to the present embodiment.

As illustrated in FIG. 8, an alignment regulating member 220 according to this modification is formed in an island shape as viewed in plan view on the TFT array substrate 10. Therefore, even when wiring lines or the like are disposed on the same layer as the layer where the alignment regulating member 220 is to be disposed, it is possible to dispose the alignment regulating member 220, and it is very advantageous from a practical perspective.

Electronic Apparatus

Figure 9:
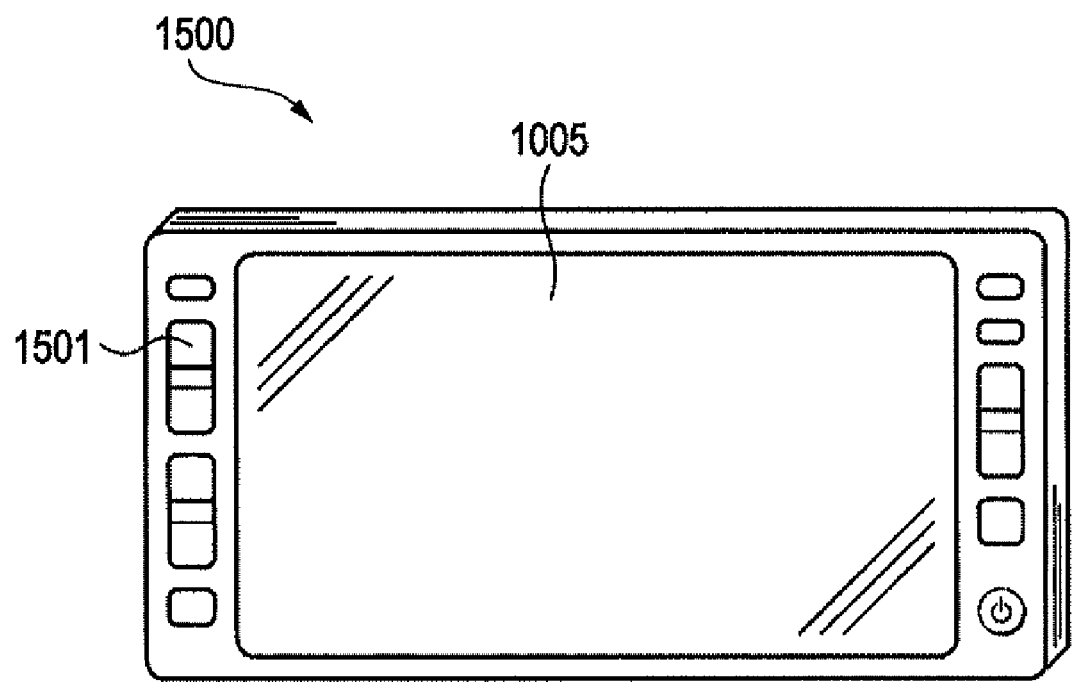
FIG. 9 is a perspective view of a car navigation apparatus to which the liquid crystal device according to the invention is applied.

An embodiment of an electronic apparatus according to the invention will be described with reference to FIG. 9. FIG. 9 is a perspective view of a car navigation apparatus to which the above-described liquid crystal device 100 is applied.

In FIG. 9, a car navigation apparatus 1500 includes a plurality of operation buttons 1502 and a liquid crystal device 1005 having the same configuration as the above-described liquid crystal device 100. Therefore, it is possible to appropriately enjoy the above-described various advantages.

Furthermore, in addition to the electronic apparatus described with reference to FIG. 9, examples of the electronic apparatus include a liquid crystal television, a viewfinder type or monitor-direct-view type video tape recorder, a pager, an electronic personal organizer, a calculator, a word processor, a workstation, a portable phone, a TV telephone, a POS terminal, and a direct-view type display device having a touch panel, and a projection type display device such as a liquid crystal projector. Moreover, it goes without saying that the invention can be applied to these various types of electronic apparatuses.

The invention is not limited to the above described embodiments, and may be modified into various forms without departing from the spirit and scope of the invention readable from the appended claims and the entire specification. The technical scope of the invention also encompasses the thus-modified liquid crystal device and an electronic apparatus having the liquid crystal device.

The entire disclosure of Japanese Patent Application NO. 2008-103428 filed Apr. 11, 2008 is expressly incorporated by reference herein.

What is claimed is:

1. A liquid crystal device, comprising:
 a pair of substrates having a liquid crystal layer disposed therebetween, the liquid crystal layer containing therein liquid crystal molecules of which the alignment state during no-voltage application corresponds to a splay alignment state;
 a plurality of pixel electrodes located on a first substrate of the pair of substrates, the pixel electrodes arranged in a matrix in a pixel region;
 a frame region defining the perimeter of an outer border of the pixel region on any one of the first substrate and a second substrate of the pair of substrates; and
 an alignment regulating member at least partially disposed in the frame region on the first substrate.

2. The liquid crystal device according to claim 1, further comprising:
 a counter electrode disposed on the second substrate so as to oppose at least one of the pixel electrodes,
 wherein the alignment regulating member is applied with an electric potential so that an electric voltage is applied between the alignment regulating member and the counter electrode so that the liquid crystal layer in the frame region is in a bend alignment state.

3. The liquid crystal device according to claim 1, wherein the alignment regulating member comprises a body portion that is disposed so as to extend along two opposing sides of the outer border.

4. The liquid crystal device according to claim 3, wherein the alignment regulating member further comprises an extension portion that is disposed so as to extend along sides adjacent to at least one of the two opposing sides of the outer border.

5. The liquid crystal device according to claim 4, wherein the extension portion is disposed in a second layer different from a first layer in which the body portion is disposed.

6. The liquid crystal device according to claim 2, further comprising a voltage supply unit for supplying the electric potential to the alignment regulating member.

7. The liquid crystal device according to claim 6, wherein the voltage supply unit supplies the electric potential for common use with a portion of various driving signals for driving the liquid crystal layer in the pixel region.

8. The liquid crystal device according to claim 1, wherein the alignment regulating member constitutes at least a portion of an electrostatic protection circuit for protecting the liquid crystal device against static electricity.

9. The liquid crystal device according to claim 1, wherein the alignment regulating member is formed in an island shape as viewed in plan view on the first substrate.

10. The liquid crystal device according to claim 1,
 wherein the alignment regulating member is disposed in a layer different from that of the plurality of pixel electrodes with an interlayer insulating film disposed therebetween.

11. An electronic apparatus comprising the liquid crystal device according to claim 1.

* * * * *